(12) United States Patent
Smith

(10) Patent No.: US 6,747,824 B1
(45) Date of Patent: Jun. 8, 2004

(54) METHOD AND APPARATUS FOR HEAD CRASH PREDICTIVE FAILURE ANALYSIS BASED UPON SLIDER TRACK MISREGISTRATION MEASUREMENT USING THE READBACK SIGNAL

(75) Inventor: Gordon James Smith, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 09/579,586

(22) Filed: May 26, 2000

(51) Int. Cl.[7] .................................................. G11B 5/09
(52) U.S. Cl. ............................ 360/31; 360/46; 360/53; 360/75
(58) Field of Search .............................. 360/75, 31, 46, 360/53

(56) References Cited

U.S. PATENT DOCUMENTS

| | | | | | |
|---|---|---|---|---|---|
| 4,872,071 A | * | 10/1989 | Easton et al. | .................. | 360/31 |
| 5,010,424 A | * | 4/1991 | Hasegawa et al. | ........ | 360/77.14 |
| 5,410,439 A | * | 4/1995 | Egbert et al. | .................. | 360/75 |
| 5,463,603 A | * | 10/1995 | Petersen | ...................... | 360/67 |
| 5,742,446 A | * | 4/1998 | Tian et al. | ..................... | 360/75 |
| 5,867,341 A | * | 2/1999 | Volz et al. | ............... | 360/77.08 |
| 5,969,896 A | * | 10/1999 | Nakamoto et al. | .......... | 318/109 |
| 6,046,871 A | * | 4/2000 | Schaenzer et al. | ............ | 360/31 |
| 6,154,335 A | * | 11/2000 | Smith et al. | .................. | 360/75 |
| 6,411,458 B1 | * | 6/2002 | Billings et al. | ............... | 360/75 |

* cited by examiner

Primary Examiner—David Hudspeth
Assistant Examiner—Glenda P Rodriguez
(74) Attorney, Agent, or Firm—Joan Pennington

(57) ABSTRACT

A method, apparatus and computer program product are provided for head crash predictive failure analysis based upon slider track misregistration measurement using the readback signal. A transducer head is selected. Then the transducer head is positioned off-track. A readback signal is obtained from the transducer head positioned off-track. The readback signal is processed and compared with historical values to identify head disk interference. The processing of the readback signal includes amplifying the readback signal using arm electronics. The amplified readback signal is demodulated to provide a demodulated signal that is proportional to its amplitude. The demodulated signal is bandpass filtered using a bandpass filter having a selected center frequency for the selected transducer head.

20 Claims, 8 Drawing Sheets

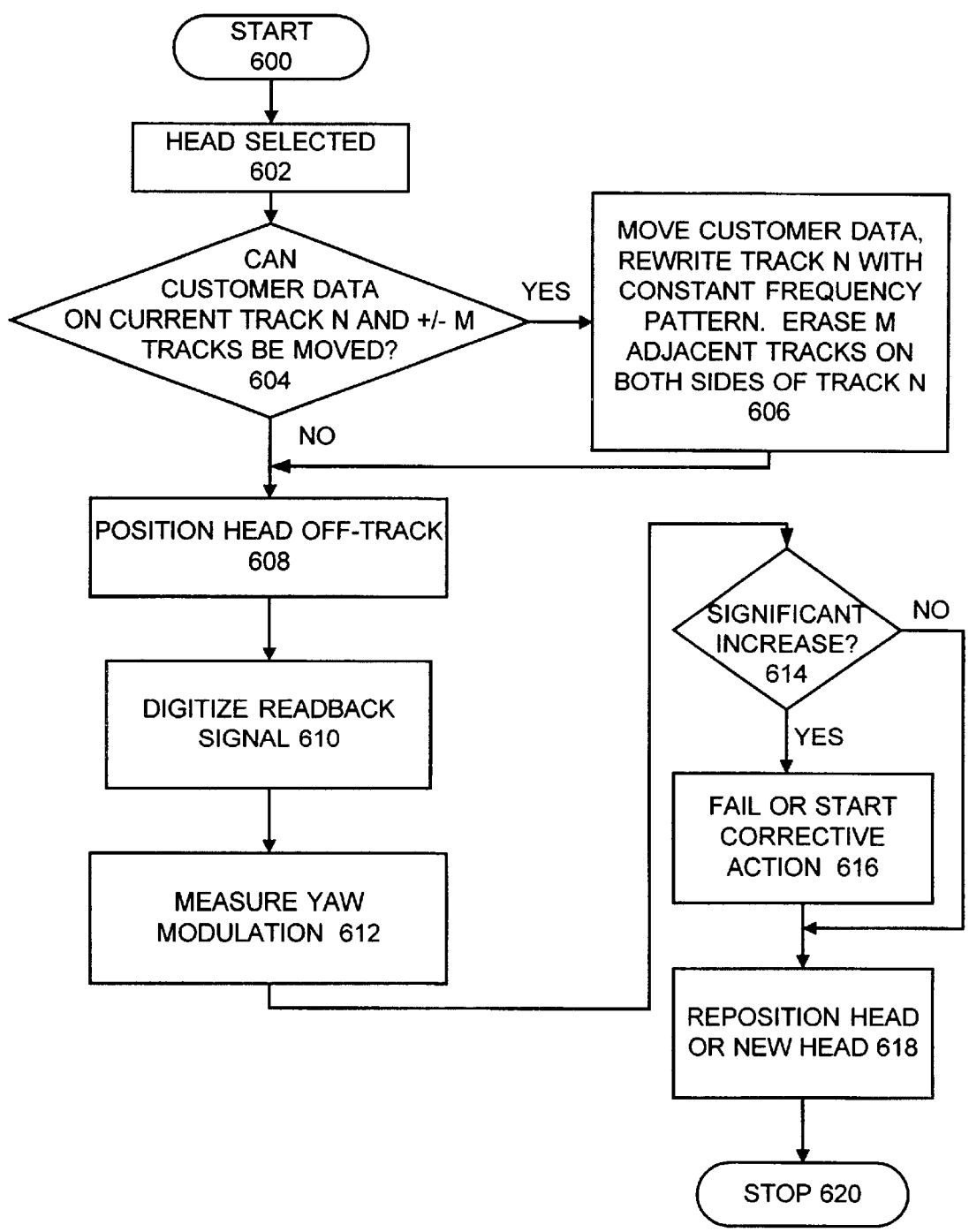

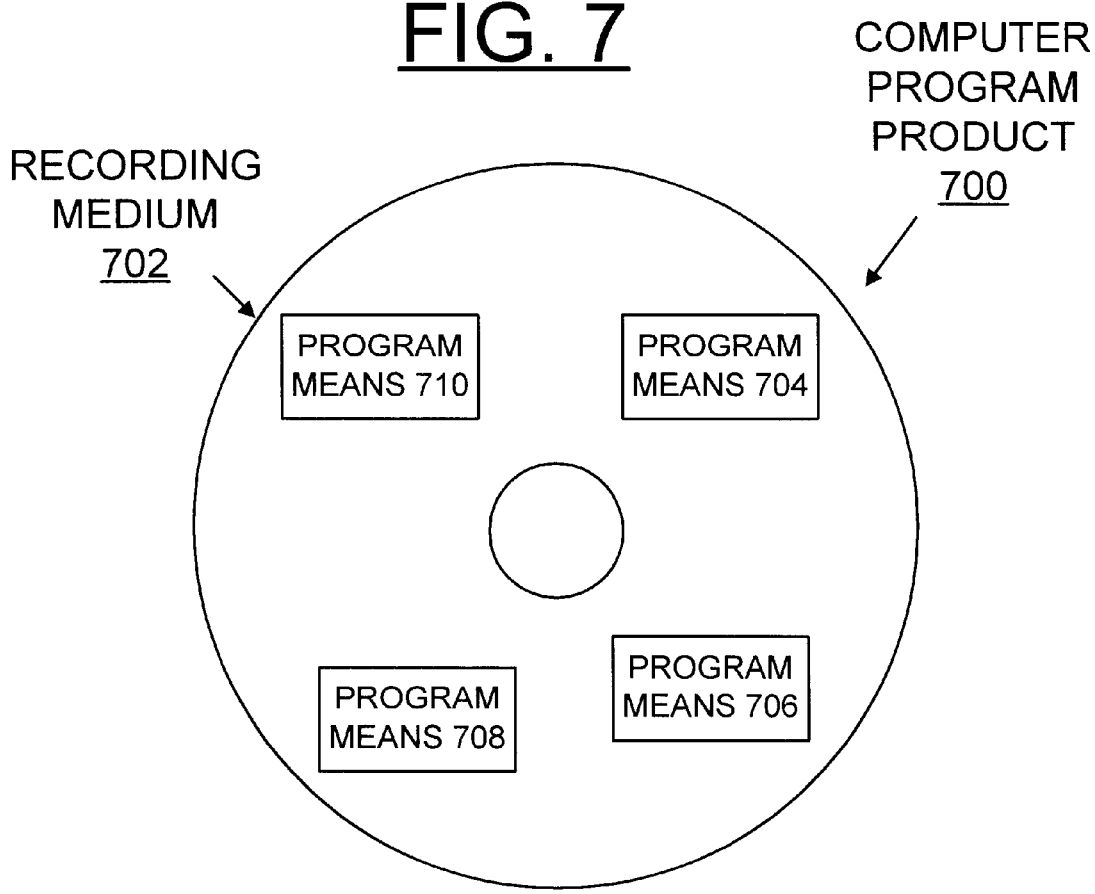

METHOD AND APPARATUS FOR HEAD CRASH PREDICTIVE FAILURE ANALYSIS BASED UPON SLIDER TRACK MISREGISTRATION MEASUREMENT USING THE READBACK SIGNAL

FIELD OF THE INVENTION

The present invention relates generally to the data processing field, and more particularly, relates to a method and apparatus for head crash predictive failure analysis based upon slider track misregistration measurement using the readback signal.

DESCRIPTION OF THE RELATED ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

Data located on a particular track on a disk surface is read or written by properly positioning a data transducer head directly over the track. In order to maintain the head in proper position over the data track, track-following servo systems often are incorporated into disk drives. Servo position control is used to position the data heads in registration with the data information tracks. A sector servo system uses the data heads as servo transducers in a time multiplexed fashion. As a head is following a particular track on a rotating disk, the head will pick up data information and servo information alternately. Servo information, interlaced with data information, is prewritten on the disk surfaces at manufacturing time within narrow radial sectors as spokes on a wagon wheel. A servo system that interlaces data and servo information is commonly referred to as sector servo or embedded servo. Another servo system uses a dedicated servo transducer head to read position signals recorded in servo information tracks on a dedicated disk surface. The data heads are ganged with the servo head for simultaneous movement relative to the data information tracks and the servo information tracks. To access the disk drive unit, a feedback sector servo controlled drive system locates the head in a desired position, where data is to be written or read.

A head crash often renders a conventional disk drive inoperable. One of the reasons for magnetic recording heads crashing of a disk surface, for example, causing catastrophic failure is the presence of protruding disk defects or asperities. The manufacturing glide test screens disk drives for unacceptable disk asperities in order to reduce the probability of a crash. Some of the disk defects also, are grown during the life of the drive. These defects include ding marks, pits, gouges, protruding disk defects or thermal asperities. Large surface bumps are notorious for causing physical head-to-disk contact, which is the precursor for a fatal disk crash. All users of hard disk drives dread even the thought of a fatal disk crash, since all data stored on that unfortunate disk drive may be lost forever.

A need exists for an improved method and apparatus for head crash predictive failure analysis.

SUMMARY OF THE INVENTION

A principal object of the present invention is to provide an improved method and apparatus for head crash predictive failure analysis based upon slider track misregistration measurement using the readback signal. Other important objects of the present invention are to provide such method and apparatus for head crash predictive failure analysis based upon slider track misregistration measurement using the readback signal substantially without negative effect; and that overcome many of the disadvantages of prior art arrangements.

In brief, a method, apparatus and computer program product are provided for head crash predictive failure analysis based upon slider track misregistration measurement using the readback signal. A transducer head is selected. Then the transducer head is positioned off-track. A readback signal is obtained from the transducer head positioned off-track. The readback signal is processed and compared with historical values to identify head disk interference.

In accordance with features of the invention, the processing of the readback signal includes amplifying the readback signal using arm electronics. The amplified readback signal is demodulated to provide a demodulated signal that is proportional to its amplitude. The demodulated signal is bandpass filtered using a bandpass filter having a selected center frequency for the selected transducer head.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4–6 are flow charts illustrating alternative, exemplary sequential steps for head crash predictive failure analysis in accordance with the preferred embodiment; and FIG. 7 is a block diagram illustrating a computer program product in accordance with the preferred embodiment.

DETAILED DESCRIPTION OF THE PREFERRED EMBODIMENTS

Figure 1:
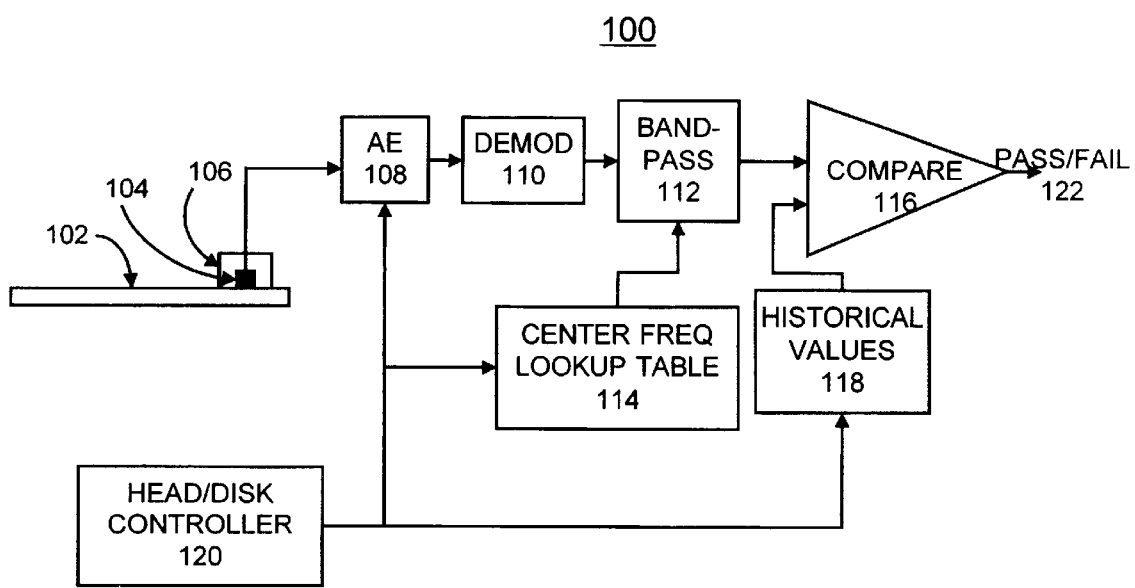
FIG. 1 is a block diagram representation illustrating apparatus for head crash predictive failure analysis based upon slider track misregistration measurement using the readback signal in accordance with the preferred embodiment.

Having reference now to the drawings, in FIG. 1, there is shown an apparatus for head crash predictive failure analysis based upon slider track misregistration measurement using the readback signal of the preferred embodiment generally designated by the reference character 100. As shown in FIG. 1, apparatus 100 includes at least one disk surface 102 together with an associated transducer head 104 carried by a slider generally designated 106 in a direct access storage device (DASD). A readback signal for the currently selected transducer head 104 in the direct access storage device (DASD) is applied to an arm electronics (AE) module 108 in the DASD. The AE module 108 amplifies the readback signal, typically by a factor of 100 or more. The amplified readback signal is applied to a demodulator (DEMOD) 110 and the amplified readback signal is demodulated in order to provide a signal that is proportional to its amplitude. The output of the demodulator 110 is passed through a bandpass filter 112. A center frequency of the bandpass filter 112 is generally equal to the yaw mode frequency of a particular slider 106 being measured. The center frequency of the bandpass filter 112 is taken from a center frequency lookup table 114 for the particular slider 106. The filtered output of bandpass filter 112 is applied to a compare 116. A historical values block 118 applies historical values to the compare 116. The historical values are previous measurements taken at the same track offset as the current values applied to the compare 116. A head/disk controller 120 is coupled to the AE module 108, the center frequency lookup table 114 and the historical values block 118. The output of bandpass filter 112 is measured by using a root mean square (RMS), peak detector, or other amplitude and compared to historical values for the particular slider 106 by the compare 116. An output of compare 116 is a pass/fail signal 122.

In accordance with features of the invention, a detection method is provided to determine if excessive slider rotation or yaw is present. Excessive slider rotation or yaw typically is caused by excessive head-disk interference. The yaw frequency, which is typically one of the suspension flexure modes, is on the order of 8500 Hz currently in some known disk drives. Since the Nyquist frequency for the servo position error signal is now 7500 Hz, the yaw frequency which does cause track misregistration or TMR is not directly observable. In accordance with features of the invention, it has been determined that the 8500 Hz TMR can be identified by using the readback signal from a transducer head. Furthermore, it has been found that the sensitivity to head-disk contact can be significantly increased by moving the head off-track. The off-track measurement method significantly improves the ability of a predictive failure analysis (PFA) algorithm of the preferred embodiment to predict failure by detecting the initial instance of contact.

Significant advantages of the PFA method of the preferred embodiment are provided over conventional PFA head crash methods. First, head-disk contact is detected regardless of the slider geometry. This is important because other PFA methods rely on the read element being the lowest point while the minimum point may not be the read element if the slider is not flat. The PFA method of the preferred embodiment is better suited to detecting slider yaw-induced TMR that servo position error signal (PES). This results because, unlike servo PES, the servo Nyquist does not play a role in the detection. This makes the measurement of the yaw mode unambiguous. This results also because the sensitivity for detecting head disk interference (HDI) is improved by sensing read signal modulation off-track. This is not possible using servo PES because the PES is continuous from inner diameter (ID) to outer diameter (OD). So even if the servo bandwidth was increased, the PFA method of the preferred embodiment detects HDI sooner. In the PFA method of the preferred embodiment, the detection of HDI can be made on any track. Current flyheight PFA methods use dedicated tracks at the inner and outer disk radii.

In accordance with features of the invention, when the output of the bandpass filter 112 has significantly increased, a warning to the user is provided. A significant increase is 20% or more or 1.2 times the original value. Also actions can be taken in an attempt to reduce the amount of head disk interference (HDI), such as initiating a stop/start, unload/load, or reducing the spindle RPM over a safe area in order to try to remove foreign degris from the airbearing surface. The safe are where the spindle RPM is reduced is an area where data is not written, such as a landing zone or buffer region of the disk surface.

Figure 2:
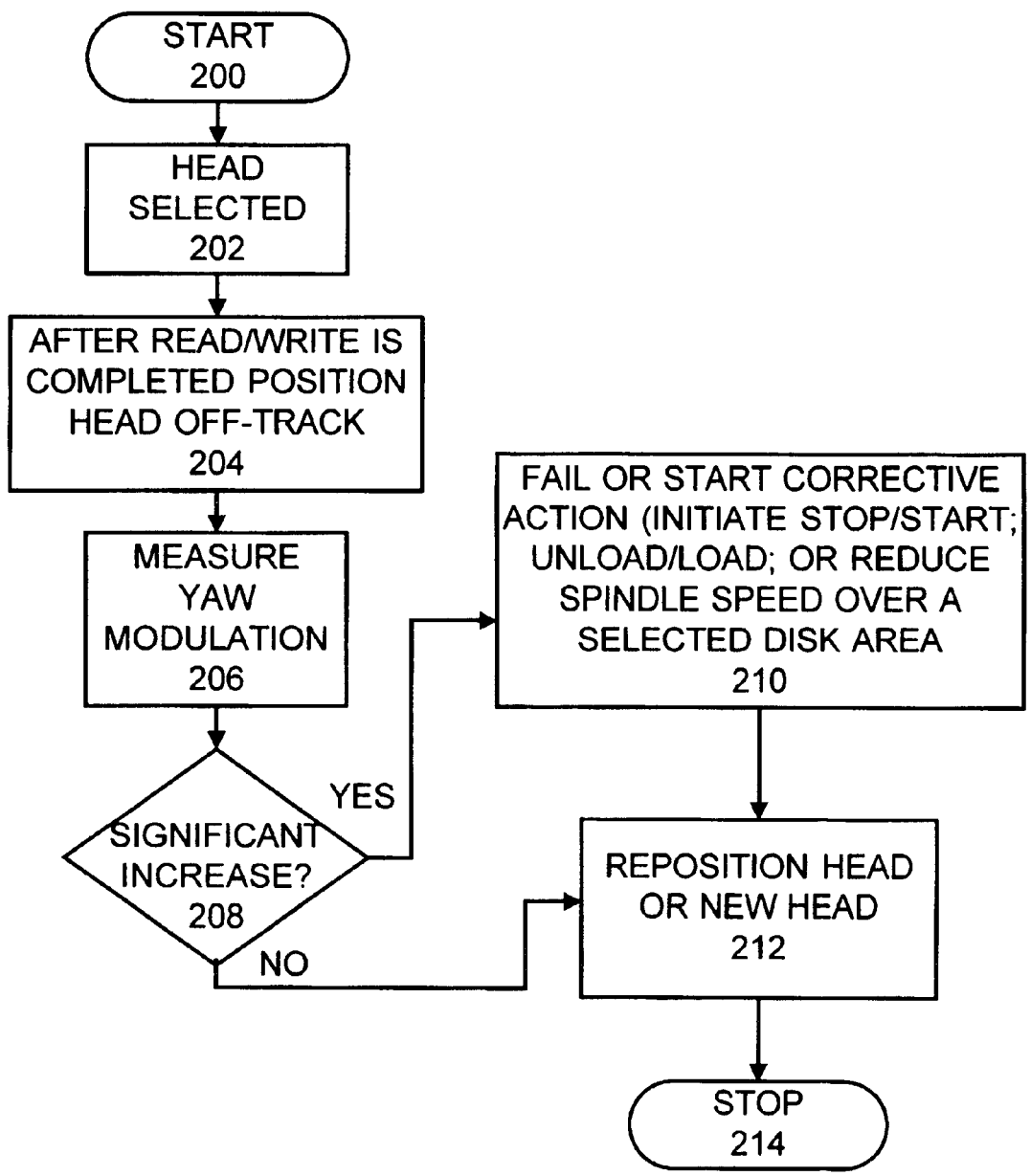
FIG. 2 is a flow chart illustrating exemplary sequential steps for head crash predictive failure analysis in accordance with the preferred embodiment.

Referring now to FIG. 2, there are shown exemplary sequential steps illustrating the head crash predictive failure analysis in accordance with the preferred embodiment starting at block 200. A transducer head 104 is selected as indicated in a block 202. After a read or write is completed, the head 104 is positioned at a selected position, such as positioned off-track as indicated in a block 204. The off-track positioning is a key feature of the preferred embodiment. Off-track sensing of the readback signal significantly enhances the detectability of HDI. By sensing the readback signal and not servo PES, the sensitivity to detecting higher resonance frequencies of the slider suspension assembly that contribute to TMR by being able to directly sense this frequency and not its alias. By positioning a head off-track, the servo PES gain does not change because of the continuous nature of the servo PES fields across the disk. The readback amplitude sensitivity to TMR increases significantly when a head is off-track. This allows the readback method of the preferred embodiment to detect the onset of HDI activity sooner than with conventional servo methods.

Next after one or two disk revolutions, the output of the bandpass filter 112 or yaw modulation is measured as indicated in a block 206 to detect any HDI induced slider yaw resonance. Checking for a significant increase as compared to previous measurements is performed as indicated in a decision block 208. When a significant increase is identified, then a fail or corrective action is started as indicated in a block 210. After the fail or corrective action is taken at block 210 or when no significant increase is identified at decision block 208, the head is repositioned or a new head selected as indicated in a block 212. This completes the sequential operations as indicated in a block 214.

Figure 3A:
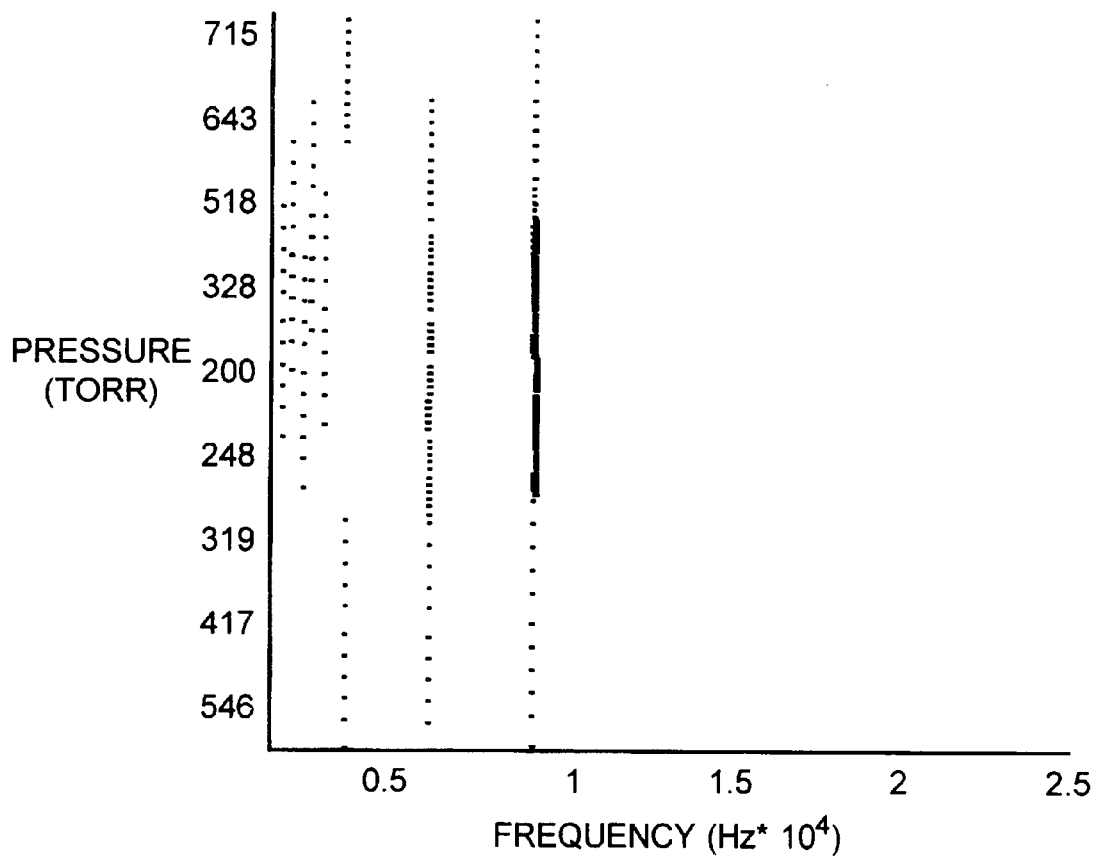
FIGS. 3A and 3B are diagrams respectively illustrating a spectrum of non-repeatable clearance modulation detector (CMD) output as a function of pressure and frequency in accordance with the preferred embodiment.
Figure 3B:
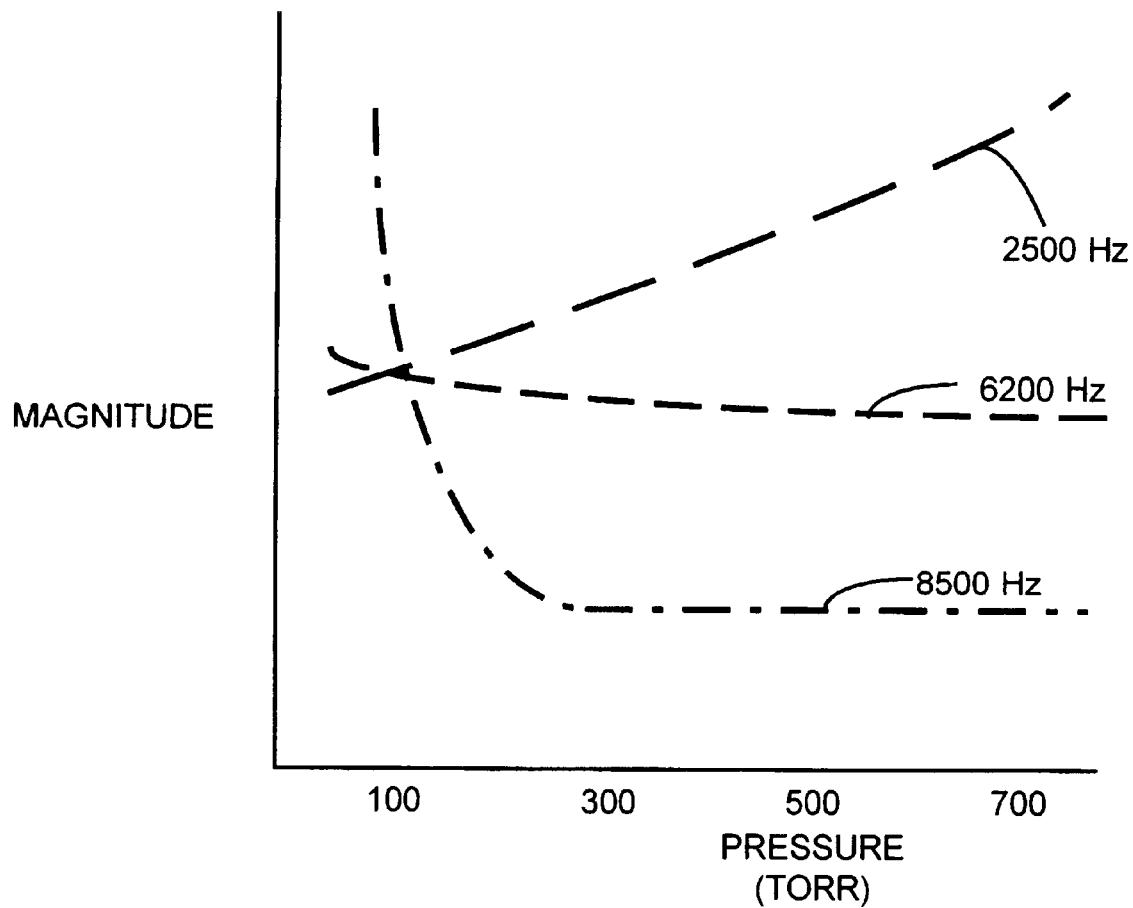

Referring to FIGS. 3A and 3B, there are shown plots of the spectrum of the non-repeatable clearance modulation detector (CMD) frequency spectrum versus ambient pressure. In FIG. 3A, the vertical axis shows the ambient pressure of the vacuum chamber that the drive is running in. In FIG. 3B, the horizontal axis shows this ambient pressure and the vertical axis shows magnitude. In FIG. 3A, the pressures are given in increasing time where the start of the experiment is at the bottom. After the drive was subjected to a low pressure of 200 Torr, it was again returned to normal atmospheric pressure of about 720 Torr. Of particular interest is the large increase in the 8500 Hz flexure torsional yaw mode that causes the head to increase its TMR. The frequency having the largest magnitude is approximately 8500 Hz. Note that the magnitude at 8500 Hz is significantly greater than and shows more change with flying height or pressure than does the 6500 Hz component. Measurements used to generate this plot were made on-track. Even greater sensitivity to flying height can be achieved by measuring readback modulation off-track. For example, with a head positioned 50% off-track, the ratio of CMD NRRO at 8500 Hz was 13 times higher at 200 Torr than at 730 Torr. In comparison when, the head was on-track, the increase was only 4 times higher at 8500 Hz.

Figure 4:
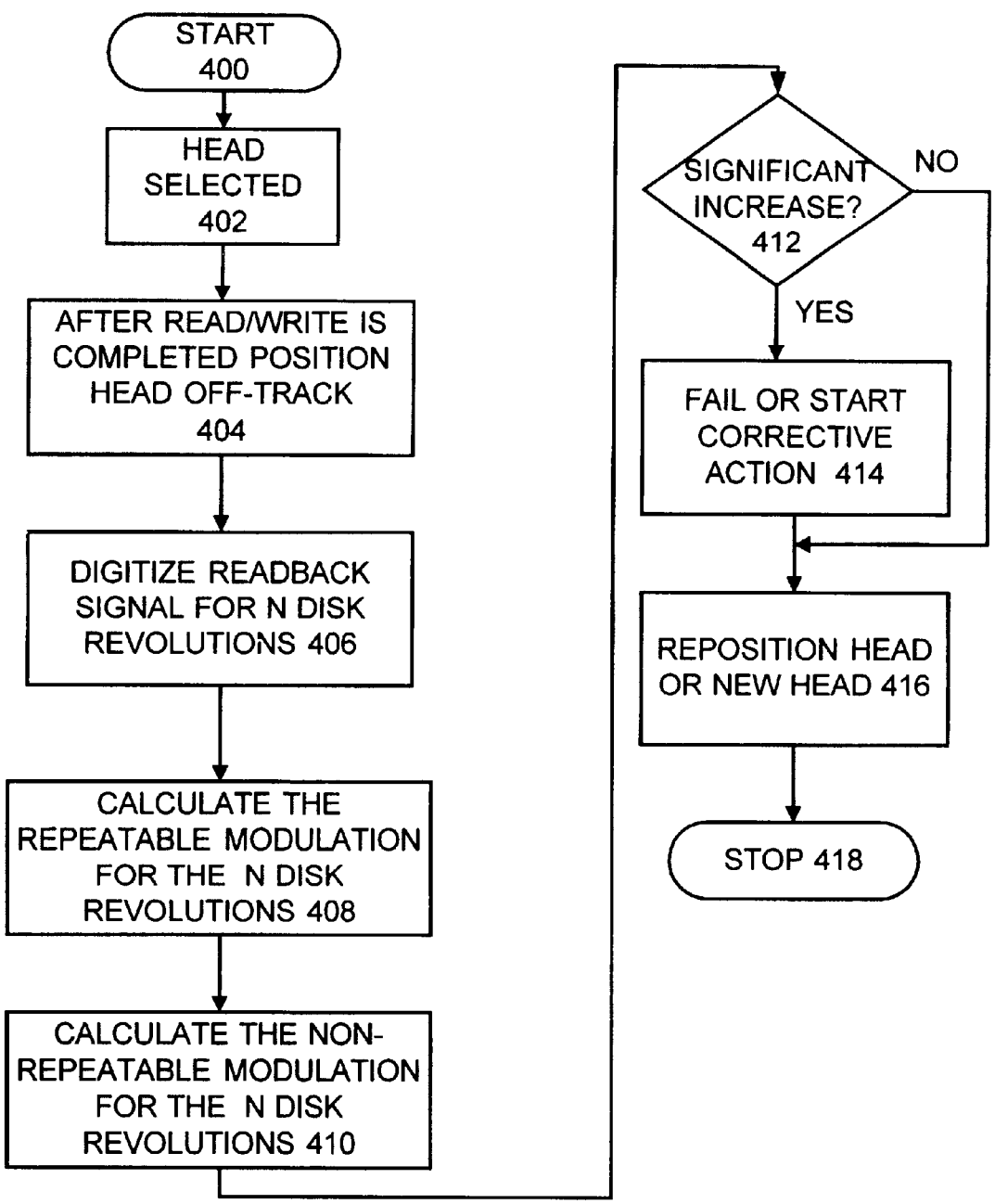

Referring now to FIG. 4, there are shown alternative exemplary sequential steps illustrating the head crash predictive failure analysis in accordance with the preferred embodiment starting at block 400. A transducer head 104 is selected as indicated in a block 402. After a read or write is completed, the head 104 is positioned off-track as indicated in a block 404. Next the readback signal is digitized for N disk revolutions as indicated in a block 406. The repeatable modulation for N disk revolutions is calculated as indicated in a block 408. Next the non-repeatable modulation for N disk revolutions is calculated as indicated in a block 410. The non-repeatable portion of the signal can be computed by first computing the stationary average, or the signal average calculated over successive disk revolutions, and then subtracting this average from subsequent measurements. Checking for a significant increase as compared to previous measurements is performed as indicated in a decision block 412. When a significant increase is identified, then a fail or corrective action is started as indicated in a block 414. After the fail or corrective action is taken at block 414 or when no significant increase is identified at decision block 412, the head is repositioned or a new head selected as indicated in a block 416. This completes the sequential operations as indicated in a block 418.

Figure 5:
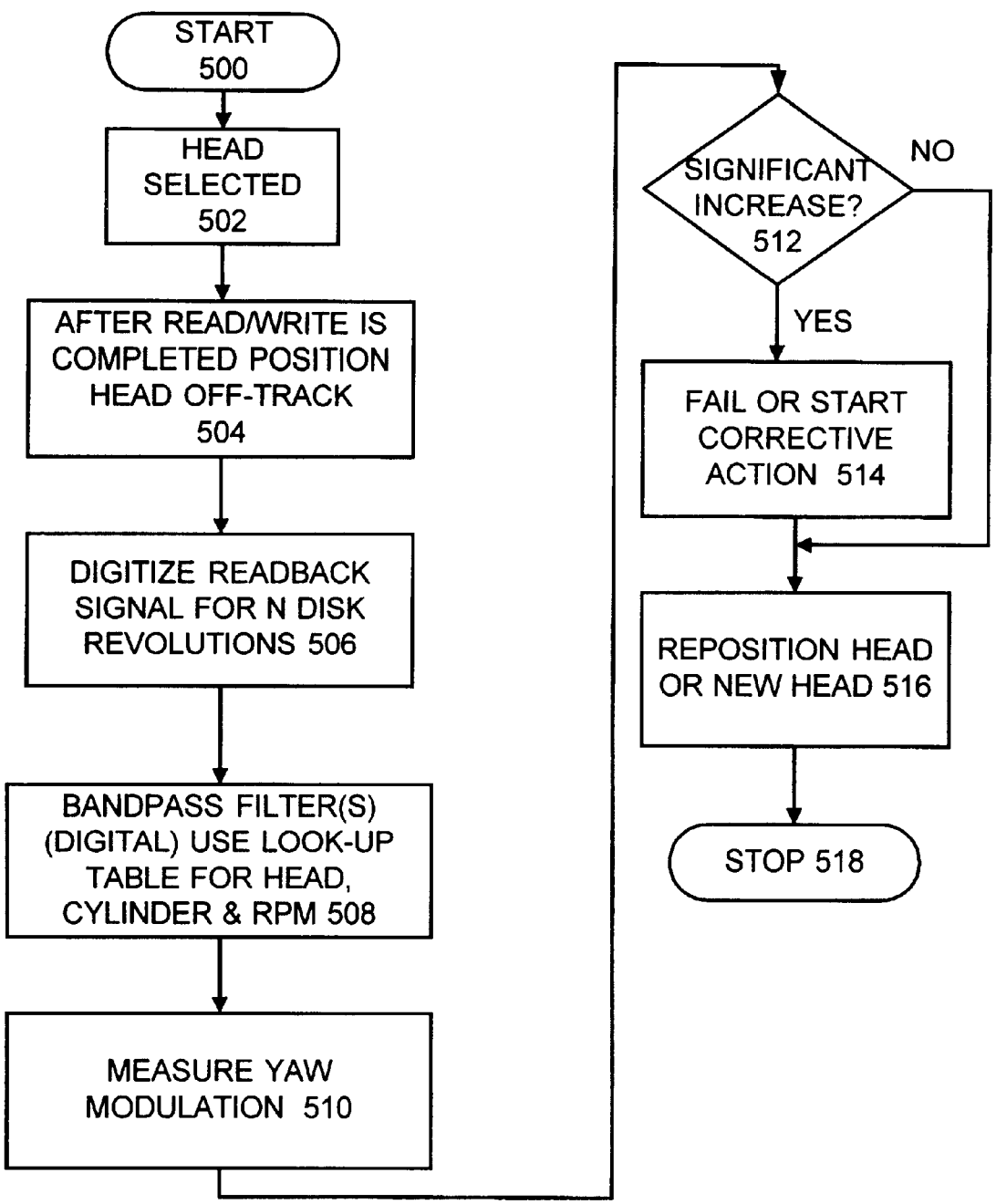

Referring now to FIG. 5, there are shown another alternative exemplary sequential steps illustrating the head crash predictive failure analysis in accordance with the preferred embodiment starting at block 500. A transducer head 104 is selected as indicated in a block 502. After a read or write is completed, the head 104 is positioned off-track as indicated in a block 504. Next the readback signal is digitized for N disk revolutions as indicated in a block 506. Then a digital bandpass filter filters the digitized readback signal with the defining coefficient for the filter's center frequency are determined when a drive is manufactured and stored in a look-up table as indicated in a block 508. The center frequency that is used for a particular head may also be a function of disk RPM and the track radius where the head is operating. Several different bandpass filter coefficients may be used depending on the number of center frequencies of interest. Next the yaw modulation is measured as indicated in a block 510. Checking for a significant increase as compared to previous measurements is performed as indicated in a decision block 512. When a significant increase is identified, then a fail or corrective action is started as indicated in a block 514. After the fail or corrective action is taken at block 514 or when no significant increase is identified at decision block 512, the head is repositioned or a new head selected as indicated in a block 516. This completes the sequential operations as indicated in a block 518.

Referring now to FIG. 6, there are shown another alternative exemplary sequential steps illustrating the head crash predictive failure analysis in accordance with the preferred embodiment starting at block 600. A transducer head 104 is selected as indicated in a block 602. Checking whether customer data on the current track N and +/−M tracks can be moved is performed as indicated in a decision block 604. If so, then the customer data on the current track N is moved, track N is rewritten with a constant frequency pattern and optionally M adjacent tracks on both sides of track N are erased as indicated in a block 606. When the M adjacent tracks on both sides of track N are erased, the sensitivity of the HDI detection is further increased. Then the head 104 is positioned off-track as indicated in a block 608. Next the readback signal is digitized for N disk revolutions as indicated in a block 610. Next the yaw modulation is measured as indicated in a block 612. Checking for a significant increase as compared to previous measurements is performed as indicated in a decision block 614. When a significant increase is identified, then a fail or corrective action is started as indicated in a block 616. After the fail or corrective action is taken at block 616 or when no significant increase is identified at decision block 614, the head is repositioned or a new head selected as indicated in a block 618. This completes the sequential operations as indicated in a block 620.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for head crash predictive failure analysis based upon slider track misregistration measurement using the readback signal of the preferred embodiment in the apparatus 100 of FIG. 1.

A sequence of program instructions or a logical assembly of one or more interrelated modules defined by the recorded program means 704, 707, 708, 710, direct the apparatus 100 for head crash predictive failure analysis based upon slider track misregistration measurement using the readback signal of the preferred embodiment.

While the present invention has been described with reference to the details of the embodiments of the invention shown in the drawing, these details are not intended to limit the scope of the invention as claimed in the appended claims.

What is claimed is:

1. A method for head crash predictive failure analysis based upon slider track misregistration measurement using the readback signal comprising the steps of:

selecting a transducer head;

positioning said transducer head at a selected position;

obtaining a readback signal from said transducer head positioned off-track;

processing said readback signal;

comparing said processed readback signal with historical values to identify head disk interference; and predicting a head crash failure, responsive to said compared processed readback signal and historical values indicating head disk interference.

2. A method for head crash predictive failure analysis based upon slider track misregistration measurement using the readback signal as recited in claim 1 wherein the step of positioning said transducer head at a selected position includes the step of positioning said transducer head off-track and further includes the steps of identifying said processed readback signal as being significantly larger than said historical values; and generating a warning signal.

3. A method for head crash predictive failure analysis based upon slider track misregistration measurement using the readback signal as recited in claim 2 further includes the step of initiating corrective action.

4. A method for head crash predictive failure analysis based upon slider track misregistration measurement using the readback signal as recited in claim 3 wherein the step of initiating corrective action includes one of initiating a stop and stop; initiating an unload and load; or reducing a spindle speed over a selected disk area.

5. A method for head crash predictive failure analysis based upon slider track misregistration measurement using the readback signal as recited in claim 1 wherein the step of processing said readback signal includes the step of amplifying said readback signal; and demodulating said amplified readback signal to provide a demodulated signal proportional to its amplitude.

6. A method for head crash predictive failure analysis based upon slider track misregistration measurement using the readback signal as recited in claim 5 further includes the step of applying said demodulated signal to a bandpass filter; said bandpass filter having a selected center frequency corresponding to said selected transducer head.

7. A method for head crash predictive failure analysis based upon slider track misregistration measurement using the readback signal as recited in claim 1 wherein the step of processing said readback signal includes the steps of identifying a non-repeatable portion of readback signal and said non-repeatable portion being compared with historical values to identify head disk interference.

8. A method for head crash predictive failure analysis based upon slider track misregistration measurement using the readback signal as recited in claim 7 wherein the step of processing said readback signal includes the steps of digitizing said readback signal for a plurality N of disk revolutions and calculating a repeatable modulation for said N disk revolutions.

9. A method for head crash predictive failure analysis based upon slider track misregistration measurement using the readback signal as recited in claim 1 wherein the step processing said readback signal includes the steps of digitizing said readback signal for a plurality N of disk revolutions and bandpass filtering said digitized readback signal.

10. A method for head crash predictive failure analysis based upon slider track misregistration measurement using the readback signal as recited in claim 1 wherein responsive to the step of selecting a transducer head, further includes the steps of moving customer data at a current track and rewriting said current track with a constant frequency pattern before the steps of positioning said transducer head off-track and obtaining a readback signal from said transducer head positioned off-track.

11. Apparatus for head crash predictive failure analysis based upon slider track misregistration measurement using the readback signal comprising:

a head and disk controller; said head and disk controller for selecting a transducer head and for positioning said transducer head off-track;

a readback signal obtained from said transducer head positioned off-track;

signal processing means for processing said readback signal;

a compare for comparing said processed readback signal with historical values to identify head disk interference; and said compare for predicting a head crash failure, responsive to said compared processed readback signal and historical values identifying head disk interference.

12. Apparatus for head crash predictive failure analysis based upon slider track misregistration measurement using the readback signal as recited in claim 11 wherein said head and disk controller is responsive to said readback signal being significantly larger than said historical values, for generating a warning signal.

13. Apparatus for head crash predictive failure analysis based upon slider track misregistration measurement using the readback signal as recited in claim 11 wherein said signal processing means includes arm electronics for amplifying said readback signal.

14. Apparatus for head crash predictive failure analysis based upon slider track misregistration measurement using the readback signal as recited in claim 13 wherein said signal processing means further includes a demodulator for demodulating said amplified readback signal to provide a demodulated signal proportional to its amplitude.

15. Apparatus for head crash predictive failure analysis based upon slider track misregistration measurement using the readback signal as recited in claim 14 wherein said signal processing means further includes a bandpass filter for filtering said demodulated signal.

16. Apparatus for head crash predictive failure analysis based upon slider track misregistration measurement using the readback signal as recited in claim 15 wherein said bandpass filter has a selected center frequency corresponding to said selected transducer head.

17. A computer program product for head crash predictive failure analysis based upon slider track misregistration measurement using the readback signal, said computer program product including a plurality of computer executable instructions stored on a computer readable medium, wherein said instructions, when executed by a direct access storage device, cause the direct access storage device to perform the steps of:

selecting a transducer head;

positioning said transducer head off-track;

obtaining a readback signal from said transducer head positioned off-track;

processing said readback signal;

comparing said processed readback signal with historical values to identify head disk interference; and predicting a head crash failure, responsive to said compared processed readback signal and historical values indicating head disk interference.

18. A computer program product for head crash predictive failure analysis based upon slider track misregistration measurement using the readback signal as recited in claim 17 further includes the steps of identifying said processed readback signal as being significantly larger than said historical values; and generating a warning signal.

19. A computer program product for head crash predictive failure analysis based upon slider track misregistration measurement using the readback signal as recited in claim 18 further includes the step of initiating corrective action.

20. A computer program product for head crash predictive failure analysis based upon slider track misregistration measurement using the readback signal as recited in claim 17 wherein the step of processing said readback signal includes the step of amplifying said readback signal; demodulating said amplified readback signal to provide a demodulated signal proportional to its amplitude; and applying said demodulated signal to a bandpass filter; said bandpass filter having a selected center frequency corresponding to said selected transducer head.

* * * * *